April 12, 1960 W. KOHLHAGEN ET AL 2,932,749
COMMUTATOR-TYPE ELECTRIC MOTOR OF REGULATED OUTPUT TORQUE
Filed Dec. 16, 1957 3 Sheets-Sheet 1
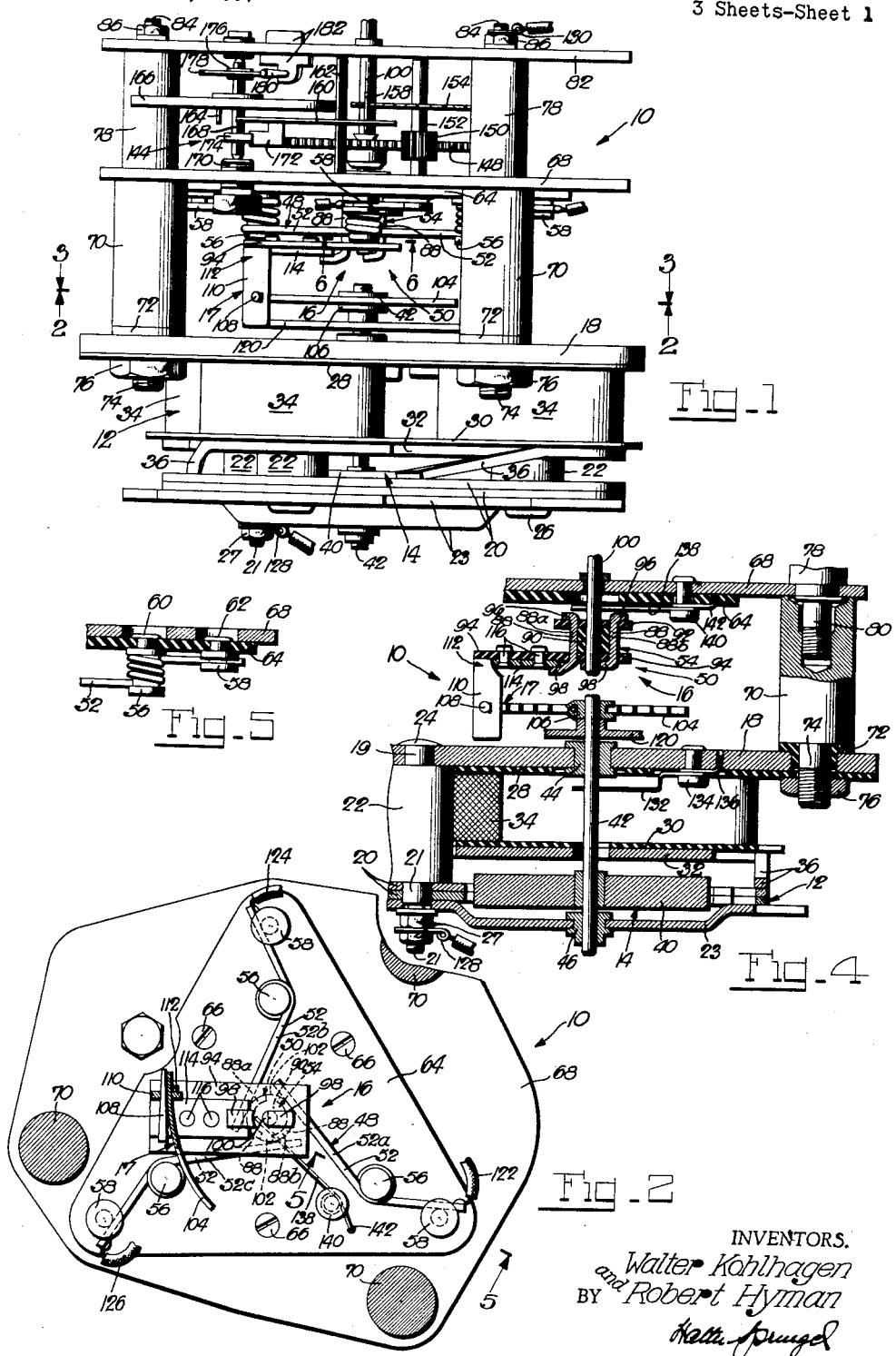
INVENTORS.
Walter Kohlhagen
and Robert Hyman
BY
Attorney.

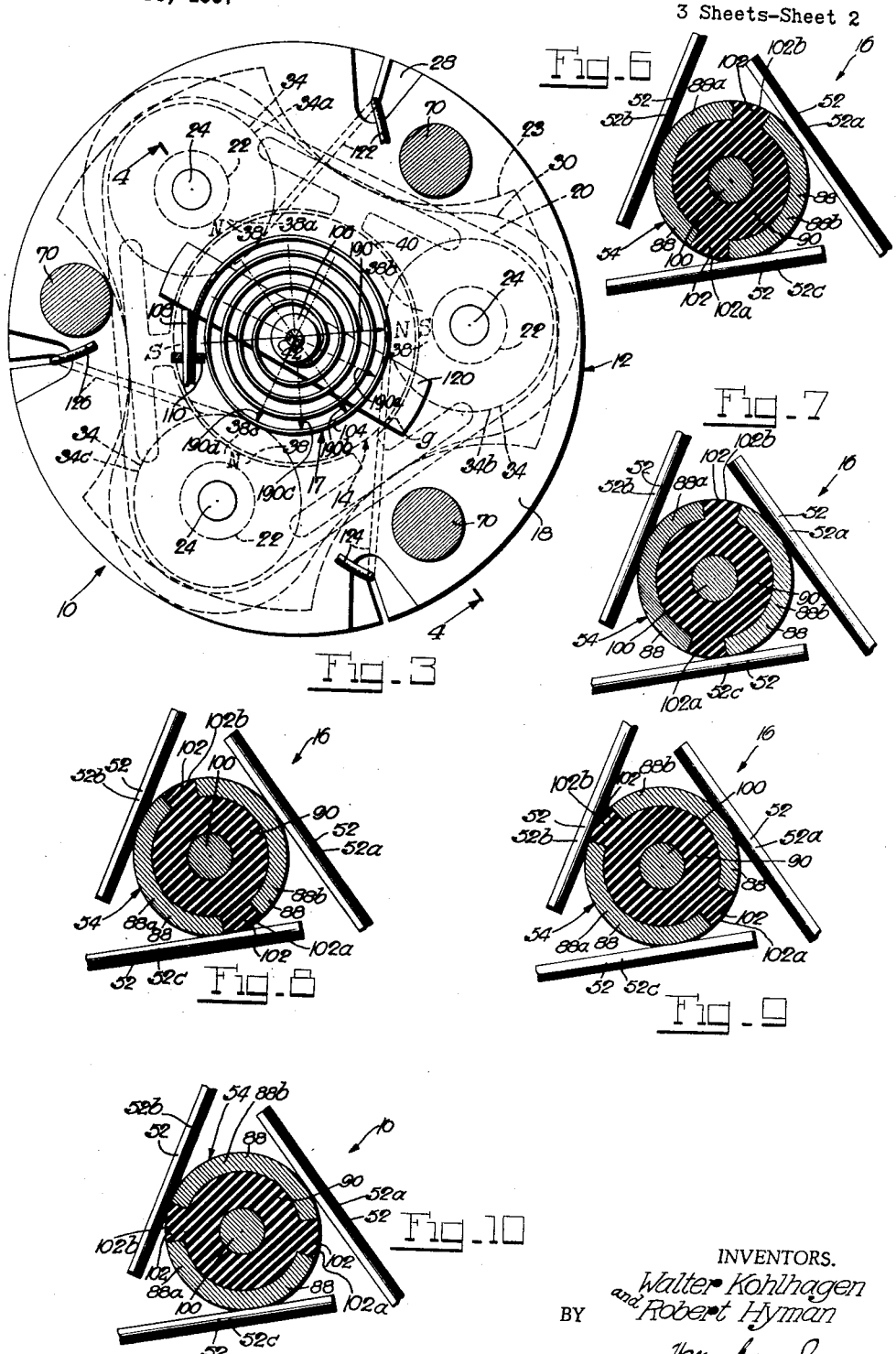

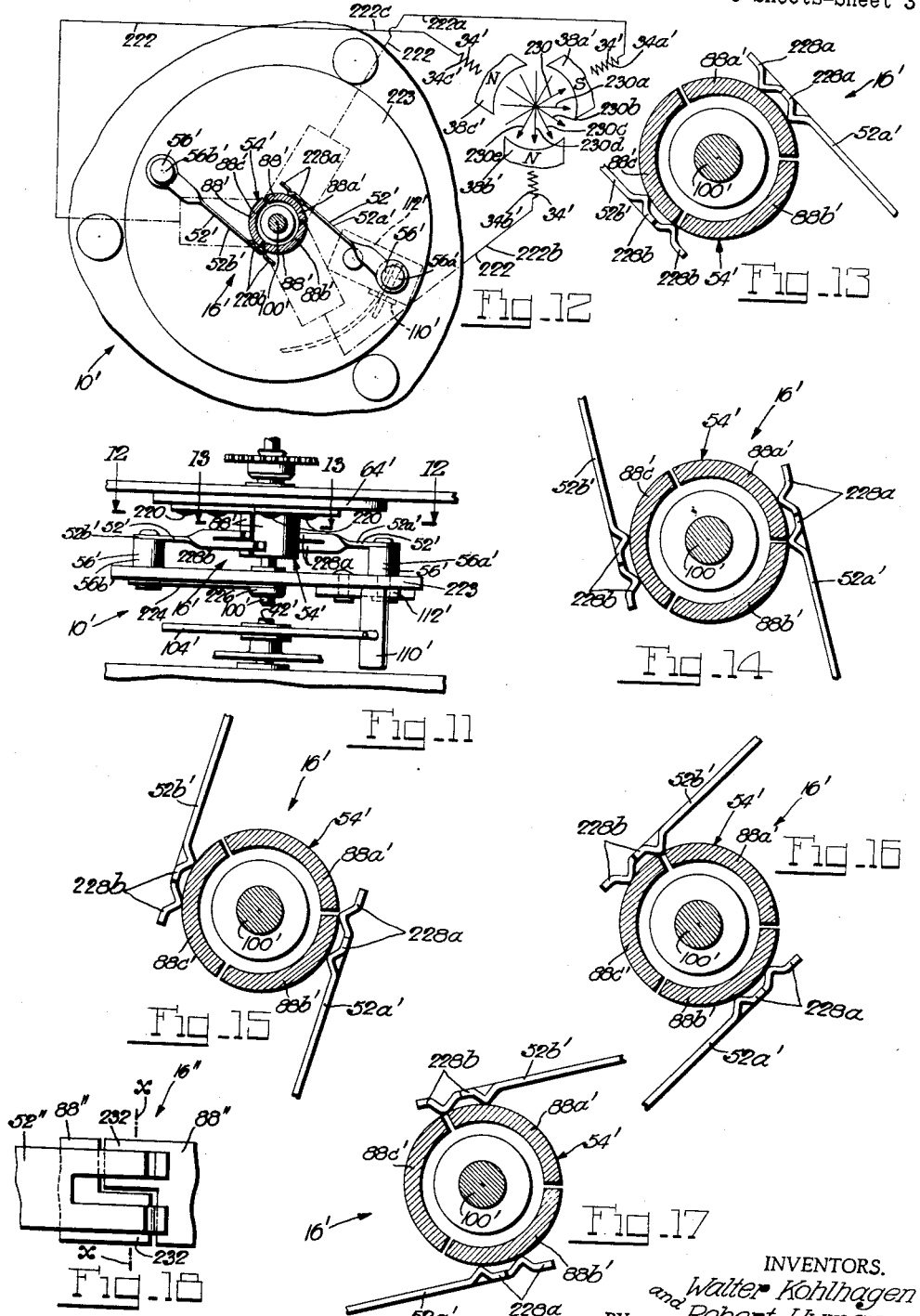

United States Patent Office 2,932,749
Patented Apr. 12, 1960

2,932,749

COMMUTATOR-TYPE ELECTRIC MOTOR OF REGULATED OUTPUT TORQUE

Walter Kohlhagen and Robert Hyman, Elgin, Ill., assignors to The E. Ingraham Company, Bristol, Conn., a corporation of Connecticut Application December 16, 1957, Serial No. 703,110

9 Claims. (Cl. 310—46)

This invention relates to commutator-type electric motors of regulated output torque.

The motor to which the present invention pertains is of the general type disclosed in the patent to Putnocky, No. 2,624,017, dated December 30, 1952. This motor features a rotor structure comprising a rotor and the rotary unit of a commutation device, in this case the commutator, of which the latter and the rotor are separated from each other and drivingly connected by a preloaded coupling spring which compels the commutator to turn in the same direction as the rotor. The commutator in this prior motor is under the control of an escapement so that the magnetic field in the field structure, and hence also the rotor, will advance rotatively in intermittent steps between rest periods which are also under the control of the escapement. Either the rotor or the commutator may be used as the output element of the motor. If the rotor is used as the output element, the full magnetic torque is available for utility purposes and the rotor will step after equal time intervals under the control of the escapement. If the commutator is used as the output element, the output torque is furnished by the preloaded coupling spring and, hence, may be considerably smaller in magnitude than the magnetic torque in the motor, and the commutator will also turn at a rate controlled by the escapement. There is also provided in this prior motor a lost-motion connection between the rotor and commutator which permits relative rotation between them through a limited range within part of which the rotor may turn in phase with the magnetic field in the field structure, and to one end of which the coupling spring will, on interruption of the current, urge the commutator and rotor so that the latter will continue in phase relation with the magnetic field on reapplication of the current.

It is the primary aim and object of the present invention to provide a motor of this type which is of exceedingly simple construction, especially in its commutation arrangement, yet performs with the rotor advancing in such small intermittent steps that the rotary unit of the commutation device is driven by the coupling spring at a torque of a magnitude which for many practical intents and purposes is constant. In thus providing for the intermittent advance of the rotor in such short steps, the periodic rewind of the preloaded coupling spring with each step of the rotor, as well as the reactive inertia forces in the latter, are kept at a minimum, with the result that the output torque of the motor is to most intents and purposes of constant magnitude if the rotary commutation unit is the torque output element, or the intermittent advances of the rotor recur quite regularly if the rotary commutation unit is under the control of an escapement, or both.

It is another important object of the present invention to provide a motor of this type which under a given load will reliably perform at lower voltages at which the prior motors of this type under the same load would most likely stall, by providing the motor with a commutation device the conductive elements of which are so coordinated that on each commutation change the simultaneous energization of sequentially energized coils, which lasted only momentarily on heretofore conventional commutation, is sufficiently extended to permit the rotor to respond with an intermittent step, thereby not only obtaining the full torque effect and benefit of the heretofore more or less ineffectual simultaneous energization of sequentially energized coils in keeping the rotor with its load in phase with the stepping magnetic field, but also increasing in any event the number of intermittent steps of the rotor for each complete revolution thereof over that achieved with conventional commutation.

It is a further object of the present invention to arrange in a motor of this type the aforementioned commutation device so that, for an uneven number of commutated poles of no less than three and for an even number of commutated poles of no less than four, the angle of overlapping commutation of all sequentially energized coils is made equal to the angle of their non-overlapping commutation, thereby not only increasing the intermittent steps of the rotor for each complete revolution thereof to twice the number achieved with the heretofore momentary overlapping commutation of the sequentially energized coils, but also achieving stepping of the rotor through equal angles.

Another important object of the present invention is to provide a motor of this type in which the commutation device achieves the aforementioned increased number of intermittent steps of the rotor per revolution with the same number of conductive segments in the commutator and the same number of brushes heretofore required for one-half the number of intermittent steps of the rotor per revolution, thereby to achieve optimum simplicity in the construction of the commutation device which is greatly instrumental in permitting highly efficient mass production of the motor, even of the smallest size, at very low cost.

Other objects and advantages will appear to those skilled in the art from the following, considered in conjunction with the accompanying drawings.

In the accompanying drawings, in which certain modes of carrying out the present invention are shown for illustrative purposes:

Fig. 1 is an elevational view of a motor embodying the present invention;

Figs. 2 and 3 are cross sections through the motor substantially as taken on the lines 2—2 and 3—3, respectively, of Fig. 1;

Fig. 4 is a fragmentary longitudinal section through the motor substantially as taken on the line 4—4 of Fig. 3;

Fig. 5 is a fragmentary section taken on the line 5—5 of Fig. 2;

Fig. 6 is an enlarged fragmentary cross section through the commutation device of the motor, substantially as taken on the line 6—6 of Fig. 1;

Figs. 7 to 10 inclusive are sections similar to that of Fig. 6, and showing the commutation device in different stages, respectively, of its operation;

Fig. 11 is a fragmentary elevational view of a motor embodying the present invention in a modified manner;

Fig. 12 is a fragmentary cross section through the modified motor substantially as taken on the line 12—12 of Fig. 11;

Fig. 13 is an enlarged fragmentary cross section through the commutation device of the modified motor, as taken on the line 13—13 of Fig. 11;

Figs. 14 to 17 inclusive are sections similar to that of

Fig. 13, and showing the commutation device in different stages, respectively, of its operation; and Fig. 18 is a fragmentary view of a further modified commutation device.

Referring to the drawings, and more particularly to Figs. 1 to 4 thereof, the reference numeral 10 designates a motor which has as its major components a field structure 12, a rotor structure 14, a commutation device 16, and a driving connection 17 between the rotor structure and the commutation device. The field structure 12 comprises a field plate 18, one or more pole plates 20, and equiangularly spaced ferromagnetic cores 22, presently three, which are interposed between the plates 18 and 20 and hold the latter in spaced parallel relation. To this end, shanks 19 on adjacent ends of the cores 22 are conveniently riveted to the field plate 18 as at 24 (Figs. 3 and 4), while their opposite end shanks 21 extend through the pole plates 20 and a superposed nonmagnetic end plate 23 and are secured to the latter. Thus, the end shanks 21 of two of the cores 22 are conveniently riveted over the end plate 23 as at 26 (Fig. 1), while the end shank 21 of the remaining core 22 is, for a reason hereinafter described, preferably threaded and receives a nut or nuts 27 for its attachment to the end plate 23. Surrounding the cores 22 and interposed between the field plate 18 and a retainer plate 32, preferably through intermediation of insulation pieces 28 and 30, respectively, are field coils 34. The plate 32 firmly holds the field coils 34 against the field plate 18, plate 32 having to this end punched-out prongs 36 which are bent out of the plane of the latter and rest against the nearest pole plate 20 (Figs. 1 and 4). The plates 20 are provided with punched-out field poles 38 which are associated with the field coils 34 (Fig. 3).

The rotor structure 14 comprises a rotor 40 on a shaft 42 which, as shown in Fig. 4, is journalled in suitable bearings 44 and 46 in the field plate 18 and end plate 23, respectively, so as to maintain an air gap $g$ of uniform width between the periphery of the rotor 40 and the field poles 38 (Fig. 3). The rotor 40 is, in this instance, a permanent-magnet disc having two opposite N and S poles (Fig. 3).

The commutation device 16 comprises a fixed unit 48 and a rotary unit 50, of which the fixed unit is, in the present example, a set of brushes 52, while the rotary unit is a commutator 54. The brushes 52, of which there are presently three due to their direct connection with the field coils 34, respectively, as described hereinafter, are in this instance in the form of simple conductive wire-type torsion springs which are anchored on posts 56 (Figs. 1, 2 and 5) and urged into engagement with the commutator 54 by being backed with their outer ends against further posts 58. The posts 56 and 58 are suitably mounted, and preferably riveted as at 60 and 62, to an insulation plate 64 (Figs. 2 and 5) which, in turn, is screwed at 66 to a plate 68 that is electrically conductive for reasons hereinafter explained, wherefore the brushes 52 are insulatingly carried by the conductive plate 68 through intermediation of the insulation plate 64. The conductive plate 68 is, in turn, carried by the field plate 18 in electrically insulated and spaced relation therewith through intermediation of pillars 70. To this end, the lower ends of the pillars 70 rest on flanged insulating bushings 72 in the field plate 18 (Figs. 1 and 4), and their reduced shanks 74 thereat project through these bushings and receive nuts 76 which bear against the insulation piece 28 on the field plate 18. The plate 68 rests on top of the pillars 70 and is held thereon by additional pillars 78 the reduced bottom shanks 80 of which are threadedly received in the respective pillars 70 (Fig. 4). The pillars 78 serve to support another plate 82 on the plate 68 in spaced relation therewith (Fig. 1). To this end, the reduced top shanks 84 on the pillars 78 extend through the plate 82 and receive nuts 86.

The commutator 54 comprises conductive segment elements 88, presently two in view of the exemplary provision of three brushes 52. The commutator 54 further comprises an insulating core 90 and opposite insulating end pieces 92 and 94 through which extend end prongs 96 and 98, respectively, of the segment elements 88 that are bent over in the fashion shown in Fig. 4 for the exemplary assembly of the commutator parts 88, 90, 92 and 94 into a self-contained unit which is firmly mounted on a shaft 100, journalled in the plates 68 and 82. The commutator segments 88 are received in longitudinal recesses in the insulating core 90 so that segments 102 of the latter extend between the conductive segment elements 88 and are peripherally flush therewith (Figs. 2 and 6 to 10).

The driving connection 17 between the rotor structure 14 and the commutation device 16 comprises a coupling spring 104 and anchor connections of its ends with the rotor shaft 42 and the rotary unit of the commutation device, presently the commutator 54. To this end, the coupling spring 104, which is preferably of spiral coiled type, is with its inner end secured, presently in the conventional manner (Fig. 4) of a hairspring of a movement, to a collet 106 on the rotor shaft 42, while the outer end of the coupling spring is anchored by a wedge 108 in a leg 110 of an L-shaped bracket 112 which with its other leg 114 is secured, by rivets 116, for instance, to the insulating arm or end piece 94 of the commutator 54.

Since the commutator-carrying shaft 100 is, in the present example, the output or load shaft of the motor and is to receive torque for the coupling spring 104, and since the required torque output in this case greatly exceeds the torque imparted to the shaft 100 solely by virtue of the stepping of the rotor structure 14 in phase with the rotating magnetic field in the field structure 12, it follows that the spring 104 must be prewound to an extent near which it will impart the required torque to the shaft 100 when the motor runs, and must remain so prewound when the motor stops as the spring would otherwise unwind and the motor become inoperative. To this end, there is provided between the rotor structure 14 and the rotary unit of the commutation device 16 a lost-motion connection which presently is in the form of a phase arm 120 on the rotor shaft 42 and cooperates with the leg 110 of the bracket 112 on the arm 94 of the commutator 54 in a manner more fully explained hereinafter.

The field coils 34 may be connected in Y or Δ fashion, and in this case may be considered to be connected in Y fashion, with their one ends connected with each other (not shown). The other ends of the field coils 34a, 34b and 34c are connected with the brushes 52a, 52b and 52c, respectively, through leads 122, 124 and 126, respectively (Figs. 2 and 3). Since the rotor 40 is, in the present instance, of permanent-magnet type, the current required for operating the motor is D.C. The current path through the motor is, in the present example, the same as that featured in the copending application of Walter Kohlhagen, Serial No. 656,280, filed May 1, 1957, now Patent No. 2,897,381. Thus, for its connection with a current source, the motor is provided with terminals 128 and 130 either one of which may be the positive terminal and the other one the negative terminal. Assuming now that the terminal 128 is the positive terminal (Fig. 4), the current flow through the motor in the exemplary relative angular position of the fixed and rotary units of the commutation device 16 (Fig. 2) is via the terminal 128, the associated core 22, stator plate 18, bearing 44, rotor shaft 42, collet 106, coupling spring 104, L bracket 112 and commutator segment 88a which by its bent-over lug 98 is electrically connected with the bracket 112 (Fig. 4), thence brush 52b (Fig. 2), conductor 124 and associated field coil 34b, thence via the field coils 34a and 34c (Fig. 3), respective conductors 122 and 126 and respective brushes 52a and 52c (Figs. 2 and 6), thence commutator segment 88b, output shaft 100 (Fig. 4) by virtue of its pressfitted reception of the bent-over lug 98 of the commutator segment 88b, plate 68 and pillar 78 to the terminal 130 (Fig. 1). To assure a permanent and reliable electrical connection between the rotor shaft 42 and the fixed field plate 18, there is additionally provided a wiping contact in the form of a wire-type torsion spring 132 (Fig. 4) which is in contact with the rotor shaft 42, and is anchored on a post 134 in electrically conductive relation with the field plate 18 and kept loaded by having its end 136 locked to the latter. To assume a like permanent and reliable electrical connection between the rotary output shaft 100 and the fixed plate 68, there is additionally provided a wiping contact in the form of a wire-type torsion spring 138 (Figs. 2 and 4) which is in contact with the output shaft 100, and is anchored on a post 140 in electrically conductive relation with the plate 68 and kept loaded by having its end 142 locked to the insulation plate 64.

When the motor is running, the coupling spring 104 will remain wound beyond its prewind extent and will, between rewinds by the stepping rotor structure 14, partially unwind at a rate depending on the load on or permissible escape rate of the shaft 100. In the present example, the running rate of the output shaft 100 is under the control of an escapement 144 (Fig. 1), and the output shaft may, as a further example, serve as the driver of a movement in the manner disclosed in the aforementioned copending application of Walter Kohlhagen, Serial No. 656,280, now Patent No. 2,897,381. To this end, the output shaft 100 carries a gear 148 which is in permanent mesh with a pinion 150 on a staff 152 which is suitably journalled in the plates 68 and 82 and carries an escape wheel 154. Cooperating with the teeth of the escape wheel 154 in conventional manner are the pallet pins 158 on one end of an escape lever 160 on a staff 162 which is suitably journalled in the plates 68 and 82. Cooperating with the other end of the escape lever 160 in conventional manner are impulse pins 164 on a balance wheel 166 on a staff 168 which is journalled in the plate 82 and in a suitable bearing 170 in the plate 68. The escape lever 160 is also provided with a guard 172 which cooperates in conventional manner with a roller 174 on the staff 168. Secured to a collet 176 on the staff 168 is the inner end of a hairspring 178, the outer end of which is secured by a wedge pin 180 to an anchor piece 182 on the plate 82. The escapement 144 just described thus permits the output shaft 100 to turn or escape at a uniform time rate.

In accordance with the present invention, the commutation device 16 is so designed and constructed that on each commutation change the heretofore momentary simultaneous energization of sequentially energized coils is sufficiently extended to permit the rotor structure 14 to respond with an intermittent step with the aforementioned important advantages. More particularly, the present exemplary commutation device 16 is so designed and constructed as to cause, on current application to the motor, alternating overlapping and non-overlapping commutation of the sequentially commutated coils through equal commutation angles. To this end, and in view of the exemplary provision of three field coils 34, the diametrically opposite insulating segments 102 of the commutator 54 must each extend over an angle of 30 degrees, as will appear more fully hereinafter, leaving each of the conductive segments 88 of the commutator extend over an angle of 150 degrees in the present example.

Let it now be assumed that the motor is running in the correct direction for the drive of the aforementioned exemplary movement by the output shaft 100, i.e., counterclockwise for the commutator 54 in Figs. 2 and 6 to 10 and clockwise for the rotor 40 in Fig. 3 due to the different directions in which the sections of these figures are taken, and let it be further assumed that the commutator 54 is in the momentary angular position shown in Figs. 2 and 6 in which the conductive commutator segment 88a is in contact with brush 52b, while the other conductive commutator segment 88b is in contact with brush 52a and is also in contact with brush 52c but is about to move out of contact with the latter. Under these circumstances, current will pass from the previously assumed "hot" commutator segment 88a through the brush 52b, conductor 124 and field coil 34b (Fig. 3), whereupon the current will branch and pass through the other field coils 34a and 34c, the respective conductors 122 and 126 and respective brushes 52a and 52c (Figs. 2 and 6) to the other conductive commutator segment 88b with its previously described ground connection, with the result that the field pole 38b will be of a polarity opposite to those of the other field poles 38a and 38c. Thus, assuming that the present polarity of the field pole 38b is S and the polarities of the other field poles 38a and 38c are N, as indicated in Fig. 3, the permanent-magnet rotor 40 will assume the position of minimum reluctance in which its polar line 190 extends as shown in Fig. 3. The rotor 40 will remain in this position for the short interval before the insulating segment 102a of the commutator 54 on the escapement-controlled output shaft 100 comes into contact with the brush 52c (Fig. 7). When this occurs, current will no longer flow through the coil 34c, but will flow through the other coils 34a and 34b due to the prevailing contact between their associated brushes 52a and 52b and the conductive commutator segments 88b and 88a, respectively, with the result that the field poles 38b and 38a will retain their respective S and N polarities, and the rotor 40 will swing into its next position of minimum reluctance in which its polar line 190a extends as shown in Fig. 3. The rotor 40 will remain in this new position until the insulating commutator segment 102a has just moved out of contact with the brush 52c and the conductive commutator segment 88a moved into contact with the latter (Fig. 8), i.e., the rotor 40 will remain in this position during escapement-controlled rotation of the commutator 54 through 30 degrees by virtue of the aforementioned angular extent of the insulating commutator segment 102a, as will be readily understood. When the commutator 54 arrives in the momentary position of Fig. 8, both brushes 52b and 52c are in contact with the hot commutator segment 88a, while the brush 52a is still in contact with the other conductive commutator segment 88b, with the result that the field poles 38b and 38c will have S polarities and the field pole 38a will have N polarity, so that the rotor 40 will now shift into its next position of minimum reluctance in which its polar line 190b extends as shown in Fig. 3. The rotor 40 will remain in this new position until the conductive segment 88a of the escapement-controlled commutator 54 rides off the brush 52b and the other insulating commutator segment 102b comes into contact with the latter (Fig. 9), i.e., during the next 30 degrees rotation of the commutator by virtue of the described angular extents of the conductive and insulating commutator segments and the equiangular spacing of the brushes. When the commutator arrives in the momentary angular position shown in Fig. 9, the brushes 52a and 52c are in contact with the conductive commutator segments 88b and 88a, respectively, while the remaining brush 52b is in contact with the insulating commutator segment 102b, with the result that the field poles 38c and 38a will have S and N polarities, respectively, so that the rotor 40 will now shift into its next position of minimum reluctance in which its polar line 190c extends as shown in Fig. 3. The rotor 40 will remain in this new position until the non-conductive segment 102b of the escapement-controlled commutator 54 rides off the brush 52b and the conductive commutator segment 88b comes into contact with the same brush 52b (Fig. 10), i.e., during the next 30 degrees rotation of the commutator by virtue of the aforementioned angular extent of the insulating commutator segment 102b. When the commutator 54 arrives in the momentary angular position of Fig. 10, brush 52c is in contact with the hot commutator segment 88a, while the two other brushes 52a and 52b are in contact with the other conductive commutator segment 88b, with the result that the field pole 38c will have S polarity and the other field poles 38a and 38b will have N polarities, so that the rotor 40 will now shift into its next position of minimum reluctance in which its polar line 190d extends as shown in Fig. 3.

It follows from the foregoing description of the exemplary partial revolution of the commutator 54 that the rotor 40 has advanced in intermittent steps of 30 degrees each, and it is quite evident from the described angular extents of the conductive and insulating commutator segments and the equiangular spacing of the brushes 52 that the rotor 40 will continue to advance in steps of 30 degrees each as long as current is supplied to the motor. Also, the rotor 40 will on each of its advances rewind the coupling spring 104 to the upper limit of its rewind range, and the latter will gradually unwind to the lower limit of its rewind range during each intermittent stop of the rotor 40 in any of its positions of minimum reluctance in the periodically shifting magnetic field in the field structure. Hence, with the rotor 40 thus advancing in relatively short intermittent steps of 30 degrees in the present example and periodically rewinding the coupling spring 104 within a correspondingly small rewind range, the latter will keep up the continuous, and presently escapement-controlled drive of the output shaft 100 at a torque which, while fluctuating slightly due to the periodic rewind of the spring 104, is to all intents and purposes constant for many practical applications, including the drive of the aforementioned exemplary movement.

On the interruption of the current, the loaded coupling spring 104 will in this instance turn the rotor 40 backwards or counterclockwise as viewed in Fig. 3 until the phase arm 120 backs against the leg 110 of the L bracket 112 on the commutator 54. When this occurs, the wind of the coupling spring 104 is reduced to its prewind extent. The phase arm 120 may be of insulating material or of metal. No harm is done if the phase arm 120 is electrically conductive, since the same is in that event merely momentarily connected in parallel with the coupling spring 104 when current is reapplied to the motor. Of course, it will be appreciated that the back-up of the rotor 40 in case of current interruption must necessarily be limited so that the rotor will return into the same phase relation with the magnetic field in the field structure when current is reapplied to the motor. Thus, assuming that the current is interrupted when the commutator 54 assumes the angular position shown in Figs. 2 and 6 in which the rotor in its corresponding position of minimum reluctance extends with its polar line 190 as shown in Fig. 3, it follows from the latter figure that the ensuing back-up of the phase arm 120 against the bracket leg 110 will leave the rotor 40 in an angular position from which it will readily return to the same position of minimum reluctance when the current is reapplied to the motor.

If the same motor 10 were provided with a heretofore conventional commutation device which on each commutation change simultaneously energizes sequentially energized coils only momentarily in characteristic fashion, it stands to reason that the rotor 40 would at each step advance through an angle which is twice as large as the angle through which the rotor advances at each step with the present type of commutation device. Thus, if a conventional commutation device with the same number of conductive commutator segments, presently two, and with the same number of brushes, presently three, were used in the instant motor, the rotor 40 would advance in steps of 60 degrees each, instead of in steps of 30 degrees each as in the present example. However, the advantageous doubling of the number of intermittent steps of the rotor per revolution of the commutator is by no means limited to the provision of three field coils and, hence, three brushes that cooperate with the commutator, as in the described exemplary motor 10. Thus, supposing that the motor were provided with five field coils and, hence, five equiangularly spaced brushes of a conventional commutation device, including a commutator with two conductive segments of identical angular extent and sufficient insulation between them to achieve the characteristic momentary simultaneous energization of the sequentially energized coils which is imperative in order to prevent stalling of the motor, the rotor would in that case advance in intermittent steps each of an angle of 180 degrees divided by five (the exemplary number of coils), or 36 degrees. Since in the same exemplary five-coil motor with a commutation device designed and constructed according to the present invention, the rotor is to advance on each step through only one-half the angle achieved with a conventional commutation device, i.e., is to advance on each step only through 18 degrees, each of the two diametrically opposite insulating segments of the commutator will have to extend over an angle of 18 degrees, and each of the two remaining conductive segments of the commutator will have to extend over an angle of 162 degrees, while the five brushes must be equiangularly spaced about the commutator. With the commutation device arranged as just described in the exemplary five-coil motor, the rotor will actually advance in intermittent steps each of 18 degrees due to the performance of this commutation device in causing alternating overlapping and non-overlapping commutation of the sequentially commutated coils through equal angles of 18 degrees each. Thus, in the case of the aforementioned exemplary three-coil and five-coil motors with the commutation device designed and constructed in accordance with the present invention as described, the angular extent of each of the diametrically opposed insulating segments of the commutator, and hence each angular advance of the rotor, will be equal to 90 degrees divided by the respective number of coils, and this latter formula for the angular extent of each of the diametrically opposed insulating commutator segments and for each angular advance of the rotor holds good for a motor having any uneven number of coils, but not less than three as the motor would then be inoperative. Thus, applying this formula to a motor with nine field coils, for instance, the rotor would on each step advance 90 degrees divided by 9 (the number of coils), or 10 degrees, by providing nine brushes in equiangularly spaced relation about the commutator, and extending each of the two diametrically opposite insulating commutator segments over an angle of 10 degrees, while extending each of the two remaining conductive commutator segments over an angle of 170 degrees.

The novel commutation device with its featured performance of causing alternating overlapping and non-overlapping commutation of the sequentially commutated coils through the same commutation angles, applies as fully to a motor having an even number of coils, but not less than four as the motor would then be inoperative. Thus, considering first the case of a four-coil motor, for example, with a conventional commutation device, the rotor of the motor would advance in steps of 360 degrees divided by 4 (number of coils), or 90 degrees, as is well known. With the commutation device of the present invention in the same exemplary four-coil motor, however, the rotor will advance in steps each of which is only one-half of 90 degrees, or 45 degrees, i.e., each step of the rotor will be equal to 180 degrees divided by the number of coils. Thus, by providing the motor with four field coils in association with four equiangularly spaced field poles and connecting them with four equiangularly spaced brushes about the periphery of a rotary commutator, the rotor will advance in steps each of 45 degrees if each of the two diametrically opposite insulating segments of the commutator extends through an angle of 45 degrees and each of the other two remaining conductive segments extends through an angle of 135 degrees. Of course, for a motor with any other even number of coils, the advance of the rotor with each step through one-half the angle achieved heretofore with a conventional commutation unit, is achieved by applying the same formula (180 degrees divided by the number of coils) for determining the angular extent of each of the two diametrically opposite insulating segments of the commutator with its two remaining conductive segments fully interposed between these insulating segments.

While in the described exemplary motor 10 the coils 34 are field coils compelling fixed mounting of the directly connected brushes relative to the rotary commutator, the present commutation unit will perform with equal advantage if the coils are carried by a non-permanent magnet rotor and the field is formed by a two-pole permanent magnet, in which case the brushes would be mounted for rotation about the fixed commutator, as will be readily understood.

While in the described motor 10 the commutator is the rotary part or unit of the novel commutation device 16, Figs. 11 and 12 show part of a motor 10' which may in all respects be like the described motor 10 to the inclusion of the coils as field coils, except that the rotary unit of the novel commutation device 16' is formed by the brushes 52' and the fixed unit of the commutation device is formed by the commutator 54'. Consequently, the brushes 52' will now lead the current to and from the commutator 54' and the segments 88' of the latter will switch the current to and from the field coils 34'. The commutator segments 88', presently three, are secured at 220 to an insulating plate 64' and have connections 222 with their respective field coils 34'. The brushes 52', presently two, are mounted on posts 56' on an insulating disc 223 on the output shaft 100', and are electrically connected with the motor terminals in the same manner as the commutator segments 88 in the described motor 10. Thus, in the present instance, the brush 52a' is through its anchor post 56a' electrically connected with a conductive L bracket 112' to the leg 110' of which is anchored the outer end of the conductive coupling spring 104' on the rotor shaft 42' that may be connected with the positive motor terminal the same as in the described motor 10, wherefore the brush 52a' may be considered to be the "hot" brush of the instant motor 10'. On the other hand, the other brush 52b' may, through its anchor post 56b', a conductive strap 224 and a conductive bearing 226 in the insulating disc 223 (Fig. 11), be electrically connected with the output shaft 100' which, in turn, may be connected with the negative motor terminal the same as in the described motor 10.

In accordance with the present invention, each of the brushes 52' has a bridge device that spans the periphery of the commutator 54' over a certain angle which, for the desired achievement of alternating overlapping and non-overlapping commutation of the sequentially commutated coils 34' through the same commutation angles, respectively, must be the same as that of each of the insulating segments 102 of the commutator 54 of the described motor 10, i.e., 30 degrees in this instance. These bridge devices are, in the present instance, in the form of pairs of prongs 228a and 228b on the respective brushes 52a' and 52b', of which the contact points of each pair of prongs with the periphery of the commutator 54' bridge the latter over the requisite angle, i.e., 30 degrees in the present example.

Let it now be assumed that current is applied to the instant motor 10' and that the rotary brushes 52', on their assumed normal clockwise rotation (Figs. 12 to 17), pass through the momentary angular position shown in Fig. 12, it will be observed in the latter figure that at that instant the hot brush 52a' is in contact with the segment 88a' of the fixed commutator 54', while the other brush 52b' is in contact with both of the other commutator segments 88b' and 88c'. Hence, the field coils 34a', 34b' and 34c', which are connected at their one ends with their associated commutator segments 88a', 88b' and 88c' through the respective leads 222a, 222b and 222c, are energized and will induce suitable polarities in their associated field poles 38a', 38b' and 38c'. Thus, assuming that the field pole 38a' is presently of S polarity, it follows that the other field poles 38b' and 38c' must be of opposite or N polarity, as shown in Fig. 12, with the result that the polar line 230 of the permanent magnet rotor (not shown) extends as shown in the same figure. On slight continued clockwise rotation of the brushes 52' from the position shown in Fig. 12 into that shown in Fig. 13, brush 52a' will remain in contact with the commutator segment 88a', while the other brush 52b' has moved out of contact with the commutator segment 88b' and is in sole contact with the remaining commutator segment 88c', with the result that the field coil 34b' is no longer energized, but the other two field coils 34a' and 34c' remain energized and continue to maintain the same polarities on their respective field poles 38a' and 38c', so that the rotor will shift through 30 degrees into its next position of minimum reluctance in the magnetic field in which its polar line 230a extends as shown in Fig. 12. On continued clockwise rotation of the brushes, through 30 degrees, from the position in Fig. 13 to that shown in Fig. 14, the hot brush 52a' will remain in contact with the commutator segment 88a' and has also come into contact with the commutator segment 88b', while the other brush 52b' remains in contact with the commutator segment 88c'. Under these circumstances, the polarities of the field poles 38a' and 38c' remain as indicated in Fig. 12, but the field coil 34b' now induces S polarity in the associated field pole 38b', with the result that the rotor now shifts 30 degrees into its next position of minimum reluctance in which its polar line 230b extends as shown in Fig. 12. On continued clockwise rotation of the brushes 52', through 30 degrees, from the position in Fig. 14 to that shown in Fig. 15, the hot brush 52a' has moved out of contact with commutator segment 88a' but remains in contact with commutator segment 88b', while the other brush 52b' remains in contact with commutator segment 88c', with the result that the field poles 38b' and 38c' retain their respective polarities S and N while the remaining field pole 38a' loses its polarity, so that the rotor now shifts, through 30 degrees, to its next position of minimum reluctance in which its polar line 230c extends as shown in Fig. 12. On continued clockwise rotation of the brushes 52', through 30 degrees, from the position in Fig. 15 to that shown in Fig. 16, the hot brush 52a' is still in sole contact with the commutator segment 88b', and the other brush 52b' is still in contact with commutator segment 88c' but has also moved into contact with commutator segment 88a', with the result that the field poles 38b' and 38c' retain their respective S and N polarities and the field coil 34a' now induces N polarity in the associated field pole 38a', so that the rotor now shifts, through 30 degrees, into its next position of minimum reluctance in which its polar line 230d extends as shown in Fig. 12. On continued clockwise rotation of the brushes 52', through 30 degrees, from the position in Fig. 16 to that shown in Fig. 17, the hot brush 52a' is still in sole contact with the commutator segment 88b', and the other brush 52b' is now in sole contact with the commutator segment 88a', having just moved out of contact with the commutator segment 88c', with the result that the field poles 38b' and 38a' retain their respective polarities S and N, while the field pole 38c' has lost its polarity, so that the rotor now shifts, through 30 degrees, into its new position of minimum reluctance in which its polar line 230e extends as shown in Fig. 12. The rotor will thus continue to advance in intermittent steps of 30 degrees each as long as the motor is supplied with current.

The aforementioned formula for determining in the exemplary commutation device 16 of the described motor 10 the angular extent of each of the diametrically opposite insulating segments of the rotary commutator with its two conductive segments for achieving alternating overlapping and non-overlapping commutation of the sequentially commutated coils through equal commutation angles, applies also fully to the commutation device 16' of the instant motor 10', except that the angle given by this formula applies to the bridge or overlap angle of the pair of contact prongs of each brush. Thus, this bridge or overlap angle of the pair of contact prongs of each brush of the commutation device 16' in the instant motor 10' equals 90 degrees divided by three (number of field coils), or 30 degrees, as described. If this motor had any other uneven number of coils, say five coils, for example, the bridge or overlap angle of the pair of contact prongs of each brush would have to be equal to 90 degrees divided by five (number of coils), or 18 degrees, in which case the rotor would advance in equal intermittent steps of 18 degrees each if the five commutator segments are equiangularly spaced and closely adjacent each other and the bridging prongs of the two brushes are diametrically opposed with respect to the axis of the commutator. On the other hand, if the instant motor 10' had an even number of coils of not less than four, then the bridge or overlap angle of the contact prongs of each brush would have to be equal to 180 degrees divided by the number of coils, in order to achieve alternating overlapping and non-overlapping commutation of the sequentially commutated coils through the same commutation angles.

While in the exemplary motor 10' the requisite bridge or overlap angle in the commutation device 16' for its featured performance is provided by the contact prongs on the brushes, the same featured performance of the commutation device in the same motor will be achieved by providing the bridge or overlap angle in the commutator instead of on the brushes. Thus, Fig. 18 shows part of a commutation device 16" in which successive commutator segments 88" have prongs 232 which overlap over the requisite angle through which the rotor of the motor is to advance on each intermittent step, while each of the two brushes 52" (one being shown) is sufficiently wide to bridge the overlapping prongs 232 and contacts them along a line substantially parallel to the commutator axis x—x.

The most important adavntage of a commutation device according to the present invention lies, of course, in the increased, and more particularly doubled, number of intermittent steps of the rotor per revolution with the same number of operating parts as those required in heretofore conventional commutation for one-half the number of intermittent steps of the rotor per revolution. Thus, at no additional cost whatsoever of a motor having the present type of commutation device, the periodic rewind of the coupling spring between the rotor and the rotary unit of the commutation device, and the inertia forces in the rotor, are kept at a minimum, so that the output torque, if delivered by the rotary commutation unit, is far more constant than that delivered by the same motor with heretofore conventional commutation. Hence, the present motor with its novel commutation lends itself particularly well to many practical applications requiring constant torque delivery, such as the drive of a movement, for example. In addition, due to the fact that the present commutation unit requires no more parts, and particularly commutator segments, brushes and lead connections with the coils, than a conventional commutation unit for the same number of coils, yet achieves the abovementioned far more constant torque delivery by a motor of this type, constant torque motors of this type may not only be manufactured, in mass production, at exceedingly low cost, but they may be built in all sizes, including exceptionally small sizes, without encountering any difficulty in their assembly. Moreover, it stands to reason that a constant-torque motor of this type, by virtue of its minimum number of parts in the very commutation device, will perform with optimum reliability for the longest time under even adverse conditions, such as vibration, for instance. Also, since the present commutation unit permits the rotor to respond fully to the entire torque effect of each overlapping commutation of the sequentially energized coils, a motor with the present commutation unit will reliably perform at considerably lower voltages at which the same motor with a conventional commutation unit would most likely fail.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a motor, the combination with a field structure having field poles, a rotor structure having rotor poles, and a number of substantially equiangularly spaced coils carried by one of said structures and the poles of the other structure being permanent magnets, of a commutation device operative on current application thereto to energize said coils in a sequence to produce in said one structure a rotary magnetic field for driving said rotor structure in phase therewith, said device having rotary and fixed units; preloaded spring means interposed and forming the sole driving connection between said rotor structure and rotary unit and urging the latter in the drive direction of the former; means providing for relative rotation between said rotary unit and rotor structure through a limited range within part of which the latter may turn in phase with the magnetic field, and to one end of which said spring means will, on deenergization of said coils, urge said rotary unit and rotor structure so that the latter will continue in phase relation with the magnetic field on reapplication of current to said device, said commutation units being a commutator with segment elements and a set of brush elements, respectively, of which the elements of one unit are conductive and equiangularly spaced about the axis of said rotary unit and are equal in number to and electrically connected with said coils, and the other unit has two conductive elements separate and disengaged from each other; and devices on said other unit disposed diametrically opposite each other with respect to the axis of said rotary unit for contact with the elements of said one unit and cooperating with said conductive elements of said other unit in establishing between the latter elements and those of said one unit a contact program to cause, on current application to said commutation device, alternating overlapping and non-overlapping commutation of the sequentially commutated coils through commutation angles, respectively, substantially equal to 180 degrees divided by the number of coils if even, and substantially equal to 90 degrees divided by the number of coils if uneven.

2. In a motor, the combination with a field structure having field poles, a rotor structure having rotor poles, and a number of substantially equiangularly spaced coils carried by one of said structures and the poles of the other structure being permanent magnets, of a commutation device operative on current application thereto to energize said coils in a sequence to produce in said one strtucture a rotary magnetic field for driving said rotor structure in phase therewith, said device having rotary and fixed units; preloaded spring means interposed and forming the sole driving connection between said rotor structure and rotary unit and urging the latter in the drive direction of the former; and means providing for relative rotation between said rotary unit and rotor structure through a limited range within part of which the latter may turn in phase with the magnetic field, and to one end of which said spring means will, on deenergization of said coils, urge said rotary unit and rotor structure so that the latter will continue in phase relation with the magnetic field on reapplication of current to said device, said commutation units being a commutator with closely adjacent segment elements and a set of brush elements, respectively, of which the elements of one unit are conductive and equiangularly spaced about the axis of said rotary unit and are equal in number to and electrically connected with said coils, and the other unit has two conductive elements separate and disengaged from each other, and two bridge devices diametrically opposite each other with respect to the axis of said rotary unit and each extending for contact with the elements of said one unit over an angle substantially equal to 180 degrees divided by the number of coils if even, and substantially equal to 90 degrees divided by the number of coils if uneven, said bridge devices being associated with said conductive elements of said other unit so as to establish, on current application to said commutation device, electrical connections between the latter elements and those of said one unit for alternating overlapping and non-overlapping commutation of the sequentially commutated coils through the same angles, respectively, as said contact angle.

3. In a motor, the combination with a field structure having field poles, a rotor structure having rotor poles, and a number of substantially equiangularly spaced coils carried by one of said structures and the poles of the other structure being permanent magnets, of a commutation device operative on current application thereto to energize said coils in a sequence to produce in said one structure a rotary magnetic field for driving said rotor structure in phase therewith, said device having rotary and fixed units; preloaded spring means interposed and forming the sole driving connection between said rotor structure and rotary unit and urging the latter in the drive direction of the former; and means providing for relative rotation between said rotay unit and rotor structure through a limited range within part of which the latter may turn in phase with the magnetic field, and to one end of which said spring means will, on deenergization of said coils, urge said rotary unit and rotor structure so that the latter will continue in phase relation with the magnetic field on reapplication of current to said device, said commutation units being a commutator and a set of equiangularly spaced brushes, respectively, of which said brushes are equal in number to and electrically connected with said coils, and said commutator has two angularly spaced conductive segments and two non-conductive segments diametrically opposite each other with respect to the axis of said rotary unit and interposed between said conductive segments, of which each of said non-conductive segments is of an extent to hold a contacting brush out of contact with either one of said conductive segments through an angle of rotation of said rotary unit substantially equal to 180 degrees divided by the number of coils if even, and substantially equal to 90 degree divided by the number of coils if uneven.

4. The combination in a motor as set forth in claim 3, in which said segments of said commutator define a continuous circular periphery, said conductive segments are of equal angular extents and said non-conductive segments are also of equal angular extents, and said brushes contact said commutator periphery tangentially.

5. The combination in a motor as set forth in claim 3, in which said coils are carried by said field structure, and said commutator is said rotary unit.

6. In a motor, the combination with a field structure having field poles, a rotor structure having rotor poles, and a number of substantially equiangularly spaced coils carried by one of said structures and the poles of the other structure being permanent magnets, of a commutation device operative on current application thereto to energize said coils in a sequence to produce in said one structure a rotary magnetic field for driving said rotor structure in phase therewith, said device having rotary and fixed units; preloaded spring means interposed and forming the sole driving connection between said rotor structure and rotary unit and urging the latter in the drive direction of the former; and means providing for relative rotation between said rotay unit and rotor structure through a limited range within part of which the latter may turn in phase with the magnetic field, and to one end of which said spring means will, on deenergization of said coils, urge said rotary unit and rotor structure so that the latter will continue in phase relation with the magnetic field on reapplication of current to said device, said commutation units being a commutator and a set of two brushes, respectively, of which said commutator has substantially identical and relatively closely spaced conductive segments equal in number to and electrically connected with said coils, and said brushes have identical diametrically opposed contact areas with said commutator each through an angle substantially equal to 180 degrees divided by the number of coils if even, and substantially equal to 90 degrees divided by the number of coils if uneven.

7. The combination in a motor as set forth in claim 6, in which each of said brushes has commutator contacts spaced apart a distance equal to said angle.

8. The combination in a motor as set forth in claim 6, in which said coils are carried by said field structure, and said set of brushes is said rotary unit.

9. In a motor, the combination with a field structure having field poles, a rotor structure having rotor poles, and a number of substantially equiangularly spaced coils carried by one of said structures and the poles of the other structure being permanent magnets, of a commutation device operative on current application thereto to energize said coils in a sequence to provide in said one structure a rotary magnetic field for driving said rotor structure in phase therewith, said device having rotary and fixed units; preloaded spring means interposed and forming the sole driving connection between said rotor structure and rotary unit and urging the latter in the drive direction of the former; and means providing for relative rotation between said rotary unit and rotor structure through a limited range within part of which the latter may turn in phase with the magnetic field, and to one end of which said spring means will, on deenergization of said coils, urge said rotary unit and rotor structure so that the latter will continue in phase relation with the magnetic field on reapplication of current to said device, said commutation units being a commutator and a set of two brushes, respectively, of which said commutator has substantially identical and relatively closely spaced conductive segments equal in number to and electrically connected with said coils, with consecutive segments having lengths overlapping each other over an angle about the axis of said rotary unit substantially equal to 180 degrees divided by the number of coils if even, and substantially equal to 90 degrees divided by the number of coils if uneven, and the contact areas between the brushes and commutator being diametrically opposite each other with respect to the axis of said rotary unit, with the brushes bridging said overlapping segment lengths on rotation of said rotary unit through the respective overlap angles.

References Cited in the file of this patent

UNITED STATES PATENTS

| | | |
|---|---|---|
| 2,102,347 | Arnold | Dec. 14, 1937 |
| 2,388,498 | Reinhard | Nov. 6, 1945 |
| 2,434,740 | Glaser et al. | Jan. 20, 1948 |
| 2,456,967 | Livers | Dec. 21, 1948 |
| 2,624,017 | Putnocky | Dec. 30, 1952 |
| 2,812,454 | Buck | Nov. 5, 1957 |